United States Patent [19]

Tushie et al.

[11] 4,137,768

[45] Feb. 6, 1979

[54] ADJUSTABLE DEPTH THERMOWELL

[75] Inventors: David R. Tushie; Douglas C. Myhre, both of Eden Prairie, Minn.

[73] Assignee: Rosemount Inc., Eden Prairie, Minn.

[21] Appl. No.: 890,997

[22] Filed: Mar. 28, 1978

[51] Int. Cl.² ............................................ G01K 1/08
[52] U.S. Cl. ................................ 73/343 R; 174/77 R
[58] Field of Search .......... 73/362 AR, 339 R, 343 R; 338/28, 30; 136/232, 235; 174/77 R

[56] References Cited

U.S. PATENT DOCUMENTS

| | | | |
|---|---|---|---|
| 1,929,905 | 10/1933 | Slotsky | 174/77 |
| 2,131,066 | 9/1938 | Opermaier | 136/235 |
| 2,533,462 | 12/1950 | Ingram | 73/362 AR |
| 2,838,935 | 6/1958 | Cecio | 73/362 AR |
| 3,681,990 | 8/1972 | Barrett | 73/343 R |

Primary Examiner—S. Clement Swisher
Attorney, Agent, or Firm—Kinney, Lange, Westman and Fairbairn

[57] ABSTRACT

An adjustable depth tubular sheath thermowell which permits changing the depth of extension of the well from its mounting into the environment to be sensed. Excess length at the exterior may be trimmed off and after trimming the open end may be sealed. An interior sensor and lead wire assembly is removable from the tubular sheath or well. The well can thus be trimmed to a desired length to fit a particular application and the fittings utilized with the well may again be reassembled to adequately seal the interior of the well against contamination and foreign material.

10 Claims, 4 Drawing Figures

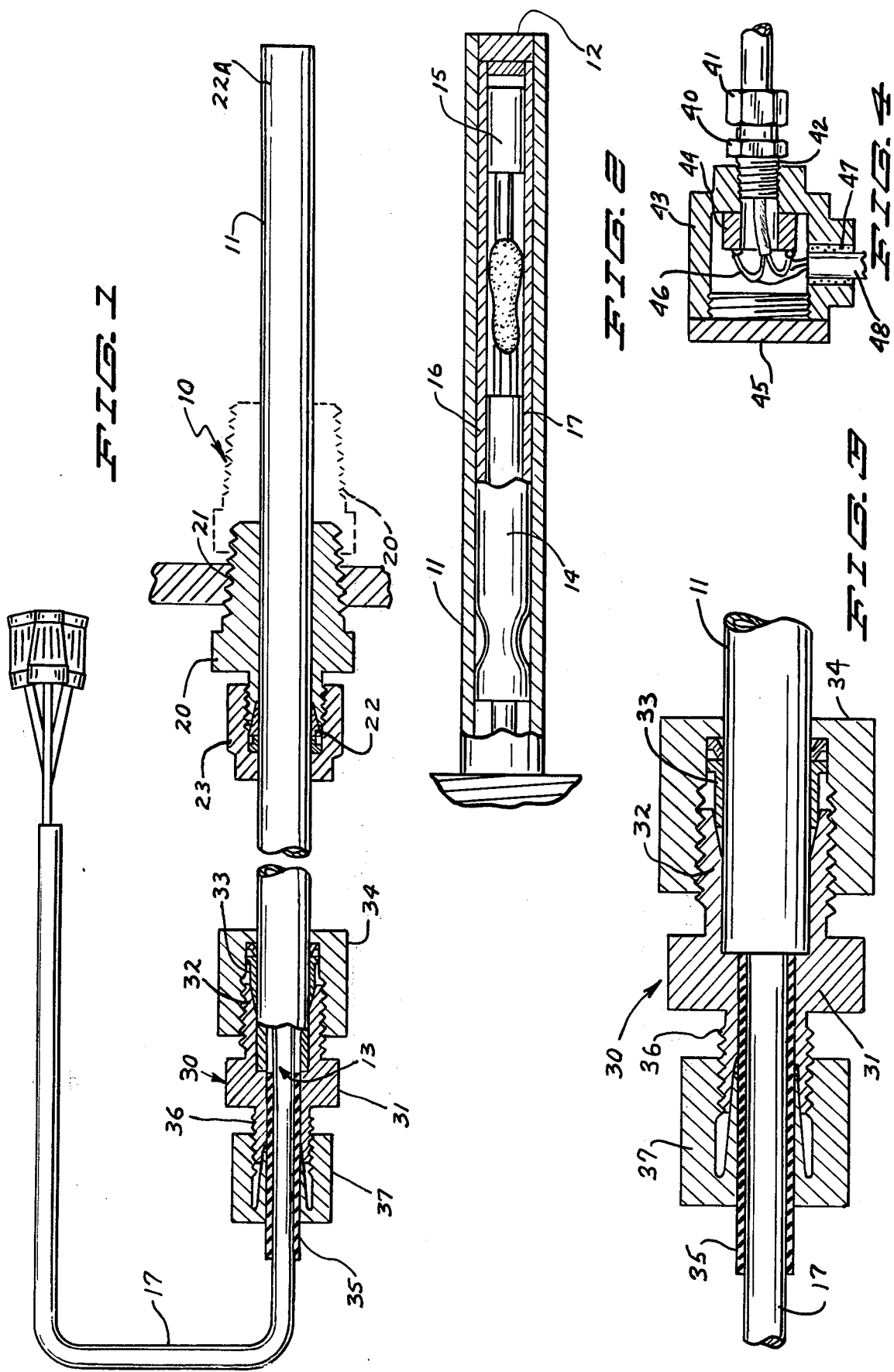

ADJUSTABLE DEPTH THERMOWELL

CROSS REFERENCE TO COPENDING APPLICATION

Reference is made to U.S. patent application of Harry Fullager, Ser. No. 884,170, Filed Mar. 7, 1978 for Temperature Probes.

BACKGROUND OF THE INVENTION

1. Field of the Invention

The present invention relates to thermowells, and in particular to a thermowell which permits adjusting the depth of insertion of the well into a housing or structure with which the thermowell is utilized. Also, by providing a removable sensor and having a sealing member at the protruding end of the sheath, the sealing member and sensor can be removed, the sheath can be trimmed as desired and the sensor and sealing member replaced.

2. Prior Art

In the prior art thermowells have long been used for holding temperature sensors in place in hostile environments. Compression fittings such as will be shown in combination with this thermowell have been utilized individually and are well known.

SUMMARY OF THE INVENTION

The present invention relates to a thermowell assembly which comprises a sheath or tube having one closed end into which a temperature sensor element, a support tube for the element and lead cables for the element are placed. The thermowell tube has a double ended compression fitting at its open end which seals on the thermowell tube and on a sleeve slipped over the lead wire cable. The components on the inside of the thermowell tube are protected from contaminants outside the thermowell tube or sheath. It is not a true hermetic seal but it provides an adequate moisture and particle seal.

Additionally, a compression fitting which grips the exterior of the thermowell tube or sheath is utilized for mounting the thermowell into a support structure. Thus the depth of penetration of the thermowell tube can be easily adjusted merely by loosening the compression fitting, sliding the thermowell tube to the desired position and then retightening the compression fitting. The sleeve at the open end of the thermowell tube or sheath is rubber and fits over the lead cable. The outer end compression fitting tightens onto the rubber sleeve to permit tightly sealing the exterior atmosphere from the interior of the sheath.

The device in assembly is readily adaptable, therefore, to a wide variety of situations without having excessive portions sticking from the structure in which the unit is mounted, and at the same time providing that the interior of the sheath and sensor assembly will not be contaminated.

BRIEF DESCRIPTION OF THE DRAWINGS

FIG. 1 is a side view of a typical thermowell sensor assembly made according to the present invention with parts of the section and parts broken away;

FIG. 2 is an enlarged sectional view through the sensor end of the thermowell assembly of FIG. 1 to illustrate the sensor construction;

FIG. 3 is an enlarged sectional view of an outer end compression fitting used for sealing the open end of the thermowell tube; and FIG. 4 is a fragmentary sectional view of a modified form of invention using a connection head fitting at the outer end of the sheath.

DESCRIPTION OF THE PREFERRED EMBODIMENTS

A thermowell assembly illustrated generally at 10 as shown includes an outer metal tubular sheath 11, which has a closed end 12 (see FIG. 2) and which is tubular throughout its length and has an open end indicated at 13. On the interior of the sheath 11 adjacent the closed end 12 there is a sensor assembly indicated at 14. The sensor assembly includes a sensing element 15 on the interior of a tube member 16. The sensor assembly is potted in place in silicone rubber or other suitable potting compound and lead wires from the element are connected to a lead wire assembly or cable indicated generally at 17. Lead cable 17 is an ordinary cable generally with four conductors inside and having a cylindrical outer jacket surface. The cable extends out through the open end of the sheath 11.

A compression fitting indicated generally at 20 is slipped over the outer surface of the sheath 11. This has a pipe thread 21 that permits the fitting to be attached to an internal thread in a structure with the end portion 22A of the sheath projecting into the environment which is to be sensed for temperature or the like. The fitting 20 closely fits over the cylindrical tube or sheath 11 and has an interior compression sleeve or ferrule 22 which fits over the sheath 11 and is tightened down onto the outer surface of the sheath 11 with a compression nut 23. The ferrule 22 has an exterior tapered surface which is forced against an interior tapered (part conical) surface to cause tightening onto the sheath or tube 11.

By loosening the nut 23 the ferrule 22 will be released from engagement with the surface of the tube or sheath 11 and the entire fitting can be slid along the sheath to provide for the amount of projection of the closed end of the sheath 11 into the environment to be sensed. Ferrule 22 may be nylon for ease of removal and adjustment in that a nylon ferrule will not permanently deform the sheath.

The outer tube 14 of the sensor assembly slip fits in the sheath 11. When in place the conductor cable 17, which is crimped adjacent the open end of tube 14, extends through the sheath 11 and out the open end 13 to suitable connectors as shown (or to a connection head as shown in FIG. 4). The conductor cable 17 is of smaller diameter than the interior of the sheath or tube 11. At the open end of sheath 11, a double ended compression fitting indicated generally at 30 adjacent the open end of the sheath is utilized for providing a seal from atmosphere from the exterior to the interior of the sheath 11.

As shown, the body 31 of the fitting 30 has a first end portion 32 which has a bore to receive the end portion of sheath 11. A compression sleeve 33 fits over the tube as well and is tightened down onto the tube or sheath by conical surfaces on the end portions 32 of the main body through the use of a compression nut 34. When the nut 34 is tightened down, there is an annular or circumferential seal where the member 32 tightens down on to the outer surface of the tube or sheath 11. This means that material cannot enter the interior of the sheath 11 through this portion of the fitting 30. The fitting 30 is available from Jaco Manufacturing Company, Berea, Ohio 44017.

The body 31 has a central opening through which the cable 17 passes as shown, and the cable is surrounded by a short piece of rubber or elastomeric tube indicated generally at 35. This tube fits within a receptacle on a second end portion 36 of the fitting 30, and as shown, a compression nut 37 is threaded on to the end portion 36 and includes a tapered sleeve or ferrule which tightens down on to the rubber sleeve 35 against a tapered inner surface of the end portion 36 as the nut 37 is tightened onto the part 36. The threads mounting nut 37 comprise an additional mounting portion on fitting 30 which mounts the means to seal the open end of the sheath.

The threading of nut 37 compresses the ferrule against the cylindrical outer surface of the rubber sleeve and down against the cylindrical outer surface of lead cable 17 to form an annular or circumferential seal around the rubber sleeve and between the rubber sleeve and the cable 17. The compression seal prevents foreign material from passing through the interior of nut 37 along the cable toward the interior of the tube 13. The compression seal formed on the two separate members is adequate to prevent foreign particulate materials and liquid from contaminating the interior of the sheath 11. The fitting 30 and elastomeric tube 35 also provides strain relief for the leads.

The fitting 30 can be quite easily removed from the sheath 11 and the cable by loosening the nut 34 and sliding the fitting off the sheath tube and at the same time sliding sensor 14 out the open end of the sheath. The sensor 14 also can be removed by removing nut 37 and pulling the lead cable and sensor out through the interior of the fitting 30 while it remains on the sheath. The fitting 30 is drilled out to permit tube 16 to slide through it. The sensor may be removed in this manner for servicing if desired.

Once the sensor is removed from the sheath 11, the sheath can be trimmed to the desired length so that it will not protrude outwardly from the structure on which the fitting 20 is mounted an excessive amount. Further, the fitting 20 can be axially adjusted in position along the sheath as desired by loosening the nut 23, sliding the sheath 11 to a new position relative to fitting 20 and then retightening the nut. When the sheath 11 has been cut off to the desired length the fitting 30 will be reattached adjacent the open end of the sheath 11 at its new length to reform the compression seal on the exterior surface of the sheath. After the cable 17 has been properly adjusted relative to fitting 30, the nut 37 would be retightened (or replaced if it was removed from the fitting) to provide a seal relative to the lead cable at its new position.

FIG. 4 illustrates a modified form of the invention which includes an outer end compression fitting 40, which corresponds in construction to fitting 30 insofar as the basic attachment to the sheath 11 is concerned. The nut 41 is the same as nut 34 in the previous form of the fitting. The threaded portion 42 has a connection head 43 which has a terminal block 44 on the interior. The threaded portion 42 comprises an additional mounting portion on the fitting. The leads 46 from the sensor are connected to screws on the terminal block 44. A cap 45 is threaded in the end of the connection head to close the access opening of the connection head.

Suitable remote leads are also connected to the terminal block and may pass through a suitable opening in the connection head to a remote location. As shown when a connection head is used, the opening 47 for the remote leads 48 extending from the head can be sealed around the remote lead wires with potting compound or the like, because the remote leads do not have to be removed from the connection head when the sheath length is changed, nor do the remote leads have to be changed in length.

With the connection head used the fitting 40 can be removed by loosening nut 41. The sensor and sensor leads may be removed from the sheath and the sheath trimmed to suitable length. The sensor leads 46 may also be trimmed in length as shown. Then the compression fitting can be replaced, the sensor leads reconnected at the terminal block and the unit reused.

The adjustable fitting 20 would be used as previously described. The connection head and terminal block form a means for sealing the lead wires with respect to the sheath opening. The housing 43 comprises a sealable member that seals the sensor lead wires relative to a compression fitting removably mounted on the end of the sheath.

Thus, very quickly, the depth of the insertion of the thermowell can be changed, and the amount of extension of the thermowell from the fitting 20 also can be altered merely by trimming the tube 11 to the desired length after the end fitting has been removed, then replacing the end fitting to provide for the seal of the interior of the unit.

The reduction of the amount of extension of the sheath from a mounting surface reduces the likelihood of damage from being struck by objects, and reduces the likelihood of an operator banging his head on the protruding sheath.

What is claimed is:

1. In a sensor mounting assembly comprising a tubular sheath member having an open end and having a sensor removably mounted on the interior of said sheath, said sensor having sensor lead wire means extending from said open end, said sheath being mountable onto a support wall, the improvement comprising a first adjustable compression fitting member mounted on said sheath and being adapted to be mounted on said support wall, said sheath passing through said first compression fitting, said first compression fitting including compression means for releasably sealingly securing the sheath against axial movement relative to the first compression fitting, a second compression fitting member adjacent the open end of said sheath having a compression fitting section releasably engaging and sealing against the outer surface of said sheath, said second compression fitting member including an additional mounting portion separate from said compression fitting section, and sealing means mounted on said additional mounting portion closing and sealing the opening of said sheath with the sensor lead wire means extending from said sheath.

2. The combination of claim 1 wherein said means mounted on said additional mounting portion comprises a connection head having an enclosed chamber, a terminal block within the enclosed chamber, and said sensor lead wire means being connected to said terminal block.

3. The combination of claim 1 wherein said means mounted on the additional mounting portion comprises an additional compression fitting section, said sensor lead wire means extending through said second compression fitting member, means surrounding said lead wire means forming a generally cylindrical outer surface, said additional compression fitting section including ferrule means to tighten onto and seal against said cylindrical outer surface.

4. In an apparatus for closing the open end of a generally cylindrical object having an outer surface which has a smaller diameter cylindrical member extending beyond said open end, the improvement comprising a tubular fitting member mounted on the open end of said cylindrical object including a first compression fitting section releasably engaging and annularly sealing against the outer surface of said cylindrical object, said smaller diameter member extending through said tubular fitting member, said fitting member having a second compression fitting section extending outwardly from the open end and including compression means to tighten down onto the outer surface of the smaller diameter member extending from said open end to thereby provide compression seals between the first fitting section and the cylindrical object and the second fitting section and the smaller diameter member.

5. The combination as specified in claim 4 wherein said cylindrical object comprises a tubular sheath for a temperature sensing assembly, said temperature sensing assembly being removably mounted in said sheath and having a lead cable extending from said open end of said sheath, said lead cable comprising said smaller diameter member.

6. The combination as specified in claim 4 wherein said compression means to tighten down onto the smaller diameter member includes a tubular elastomeric member surrounding said smaller diameter member.

7. The combination of claim 4 wherein said cylindrical object comprises a sheath for a sensor assembly, and a sensor assembly slidably, removably mounted in said sheath, said smaller diameter member comprising a portion of said sensor assembly, said first compression fitting section of said fitting member being removable from the sheath to permit removal of said sensor assembly and to thereby permit trimming the sheath to a desired length, said compression means being adjustable to provide a seal at a new position on the smaller diameter member when the sensor assembly is reinserted into the sheath after trimming and after the first compression fitting section is mounted on the open end of the sheath.

8. The combination of claim 4 wherein said cylindrical object comprises a sheath for a sensor assembly, and a sensor assembly slidably, removably mounted in said sheath, said smaller diameter member comprising a portion of said sensor assembly, said fitting member having an interior opening of size so that said sensor assembly will slide through said fitting member, said compression means being releasable from the second compression fitting section to permit the sensor to be removed through the fitting member in order to service the sensor.

9. A sensor mounting assembly comprising a tubular sheath member having an open end, a sensor assembly including a generally cylindrical element slidably mounted on the interior of said sheath, said sensor assembly having sensor lead wire means extending from said open end of said sheath when the assembly is properly positioned in said sheath, comprising a first adjustable compression fitting member mounted on the exterior of said sheath and being adapted to be mounted on said support wall, said sheath passing through said first compression fitting, said first compression fitting including first compression ferrule means for releasably sealing and securing the sheath against axial movement relative to the first compression fitting, a second compression fitting member adjacent the open end of said sheath having a compression fitting section releasably engaging and sealing against the outer surface of said sheath adjacent said open end, said second compression fitting member being tubular and said sensor lead wire means extending through said second compression fitting member, said second compression fitting member including an additional mounting portion separate from said compression fitting section, and sealing means mounted on said additional mounting portion and positioned beyond the open end of said sheath closing and sealing the opening of said sheath with the sensor lead wire means extending from said sheath.

10. The method of adjusting the amount of protrusion of a thermowell outwardly beyond a support wall wherein said thermowell includes an outer sheath having an open end extending outwardly from the support wall, a sensor assembly removably mounted in said outer sheath and including a lead cable extending outward from the open end of said sheath, comprising the steps of providing adjustable support means to mount said sheath to the wall and adjusting the thermowell to a desired position, removing the sensor assembly from the sheath, removing excess portions of said sheath, and providing a second compression fitting including a first portion that releasably seals against the outer surface of said sheath adjacent said open end, and a second portion which extends beyond said open end and includes means to seal the opening of said sheath, and tightening said second compression fitting over the open end of the sheath after the excess portions of the sheath have been removed and the sensor assembly is remounted within said sheath.

* * * * *